United States Patent [19]

Loewke et al.

[11] Patent Number: 4,919,479
[45] Date of Patent: Apr. 24, 1990

[54] APPARATUS FOR CARRYING A PASSENGER ON A BICYCLE

[76] Inventors: Eunice R. Loewke, 1307 Jasmine Cir., Rohnert Park, Calif. 94928; Daniel D. Loewke, 3060 N.E. Wheeler St., Poulsbo, Wash. 98370

[21] Appl. No.: 233,817

[22] Filed: Aug. 19, 1988

[30] Foreign Application Priority Data

Aug. 20, 1987 [AU] Australia ............................ 77264/87

[51] Int. Cl.⁵ .............................................. B62J 1/28
[52] U.S. Cl. ..................................... 297/195; 280/202
[58] Field of Search .......................... 297/195; 280/202

[56] References Cited

U.S. PATENT DOCUMENTS

| 2,448,867 | 9/1948 | Darden | 280/202 |
| 3,902,737 | 9/1975 | Berger et al. | 280/202 |
| 4,305,532 | 12/1981 | Reminger | 280/202 X |
| 4,632,453 | 12/1986 | Robbin et al. | 297/195 X |

FOREIGN PATENT DOCUMENTS

| 715356 | 11/1941 | Fed. Rep. of Germany | 280/202 |
| 1053101 | 9/1953 | France | 280/202 |
| 307439 | 5/1933 | Italy | 280/202 |
| 12131 | 5/1909 | Norway | 280/202 |
| 111191 | 11/1917 | United Kingdom | 280/202 |

Primary Examiner—Peter A. Aschenbrenner

[57] ABSTRACT

An apparatus for carrying a passenger on a bicycle in the form of a carrier having a first end and a second end and seat located intermediate said first and second ends. The apparatus is provided with locating means for locating the carrier on the frame of the bicycle. The locating means are provided at least two substantially mutually remote locations so that the carrier means is locatable on the bicycle frame substantially forward of the seat of the carrier of the rider of the bicycle.

7 Claims, 8 Drawing Sheets

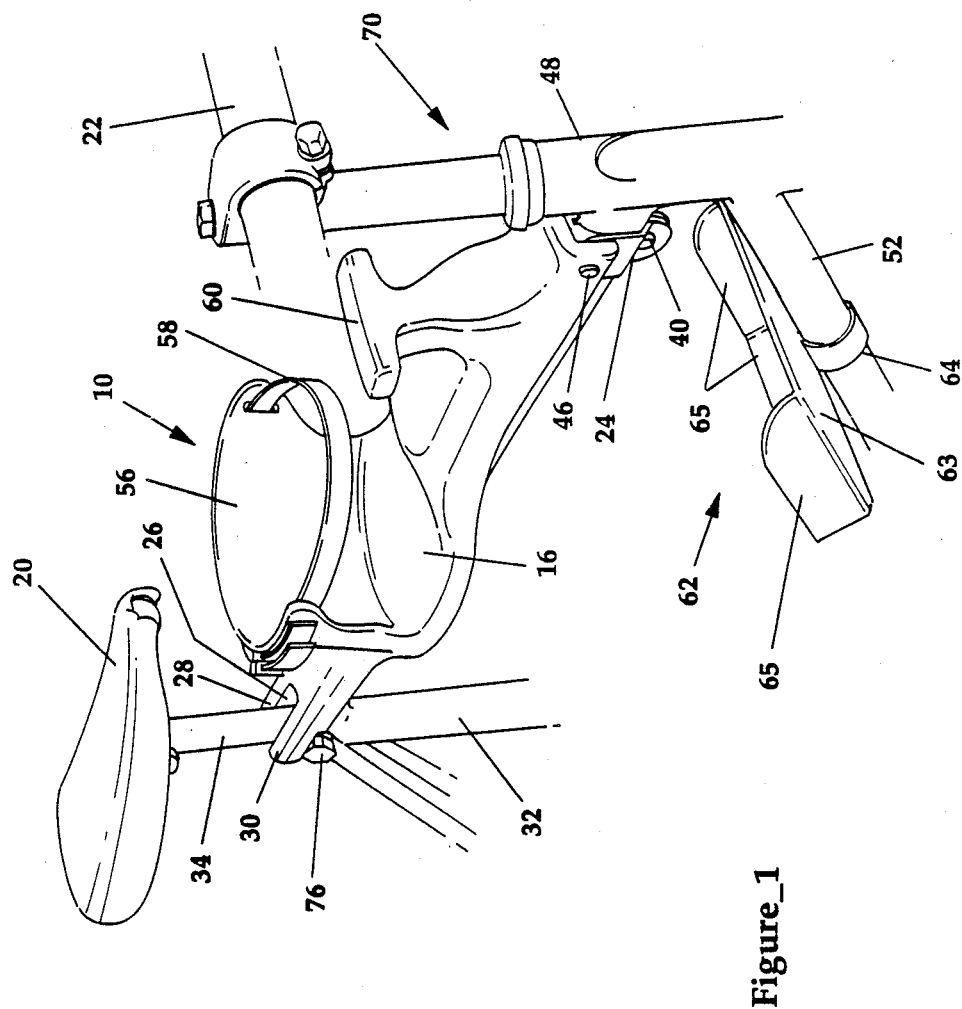
Figure_1

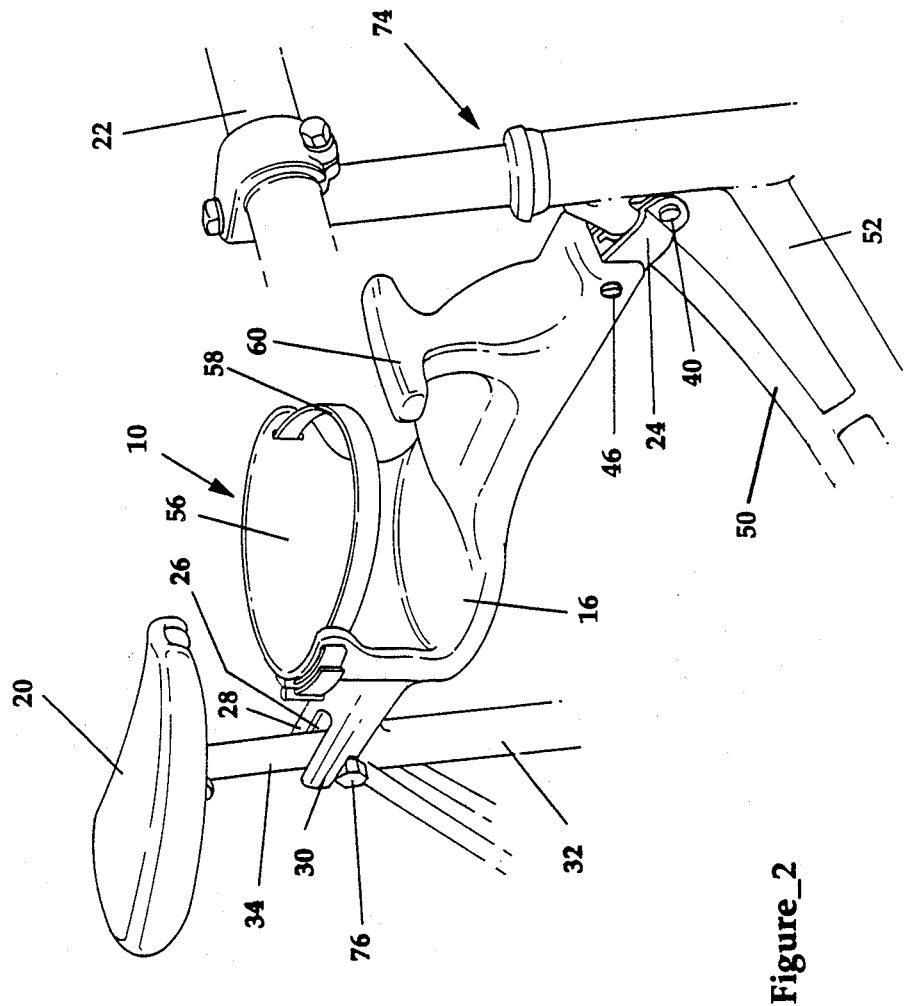
Figure_2

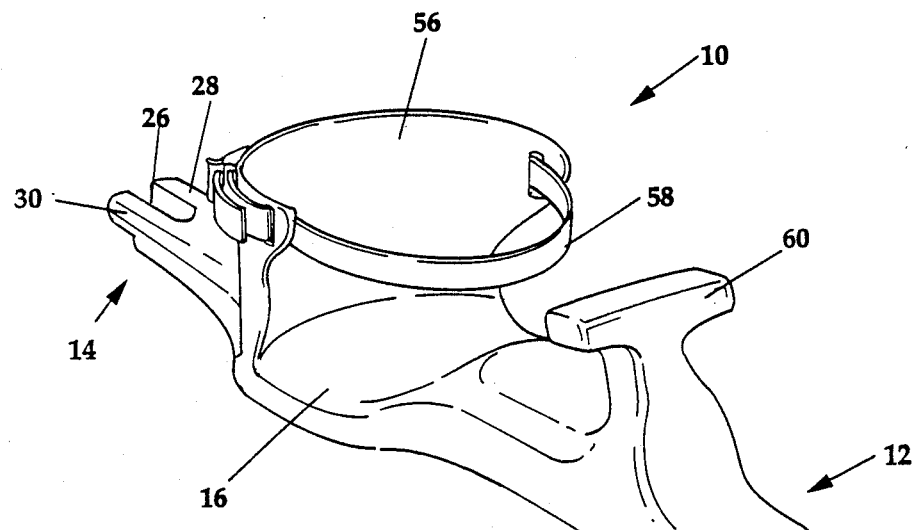
Figure_3
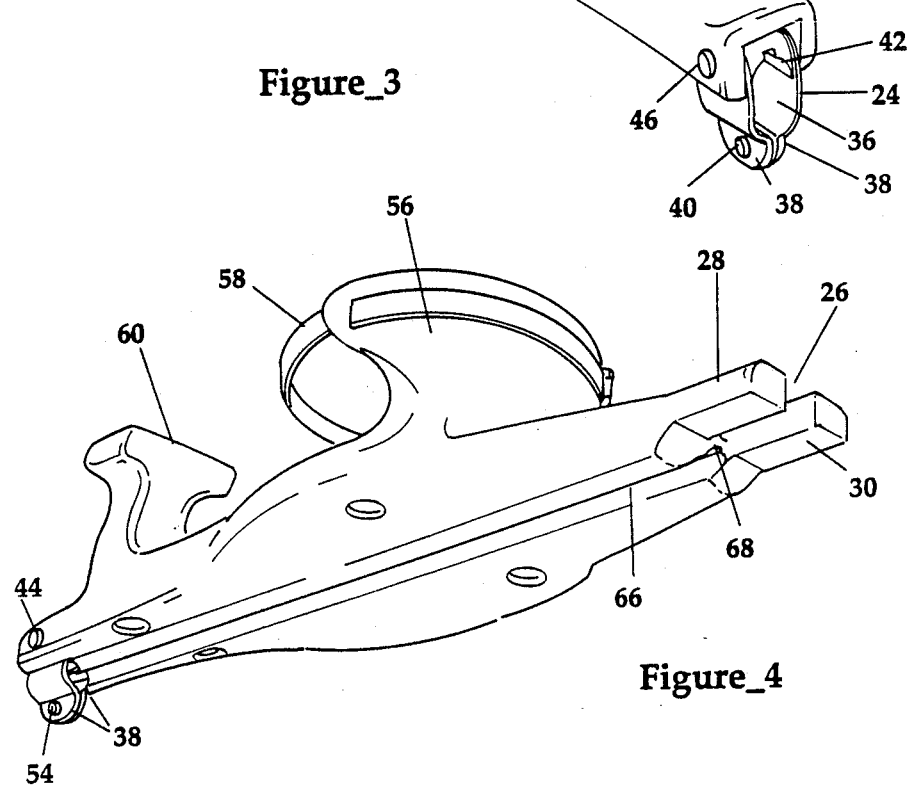
Figure_4

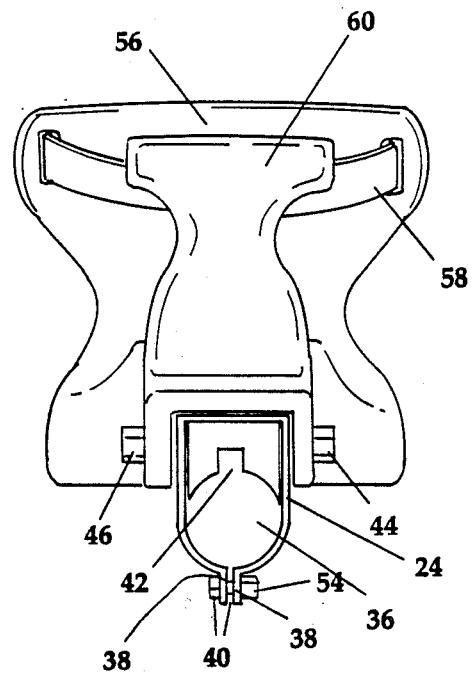
Figure_5
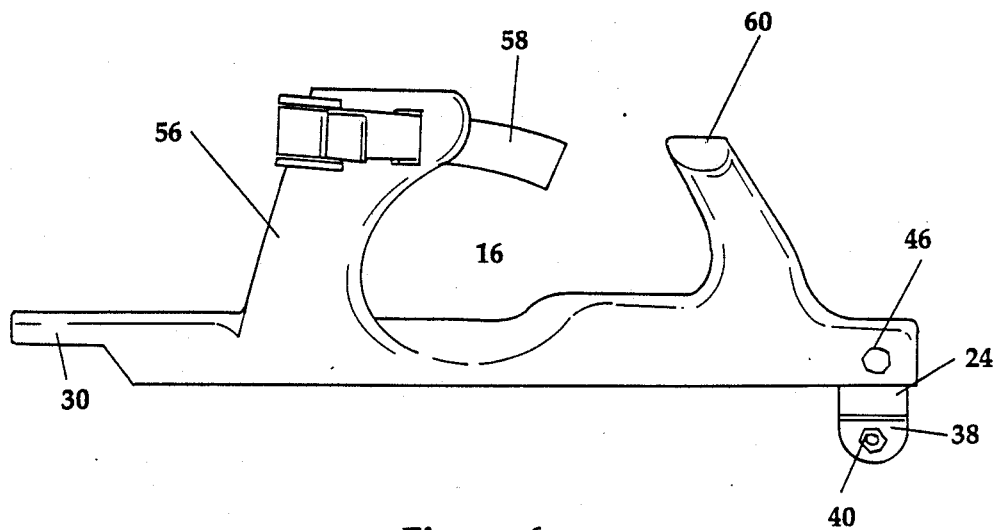
Figure_6

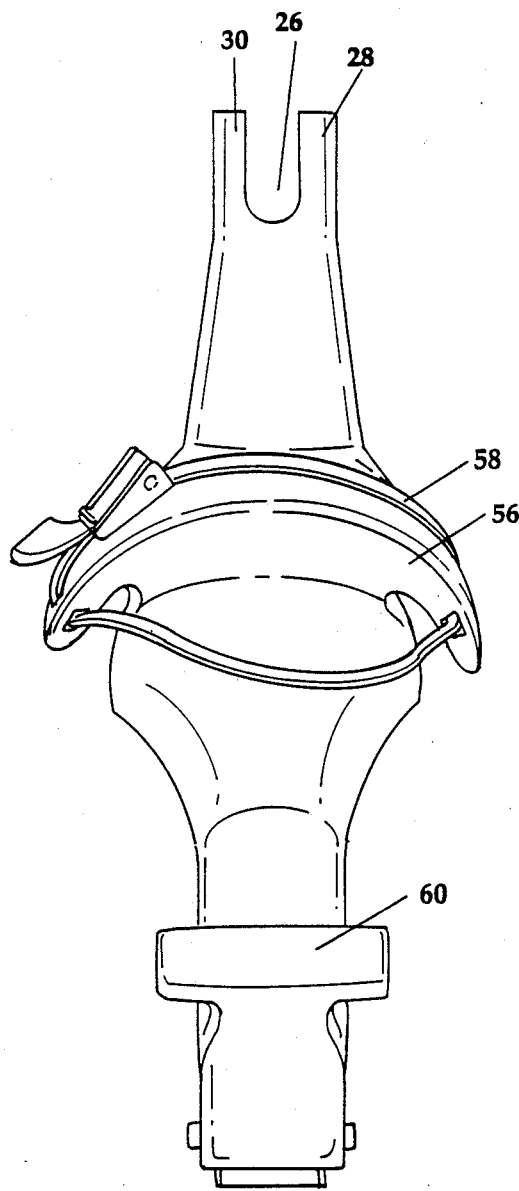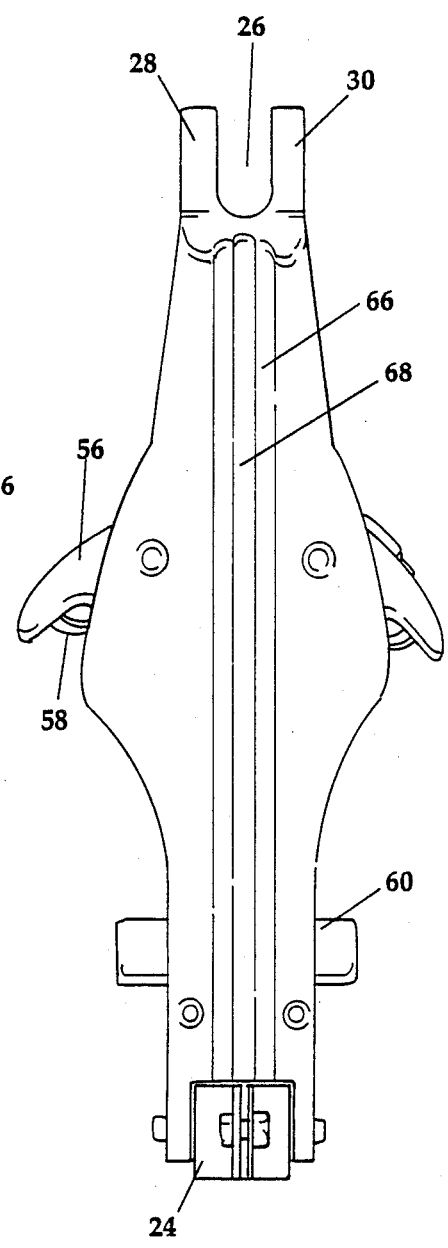
Figure_7  Figure_8

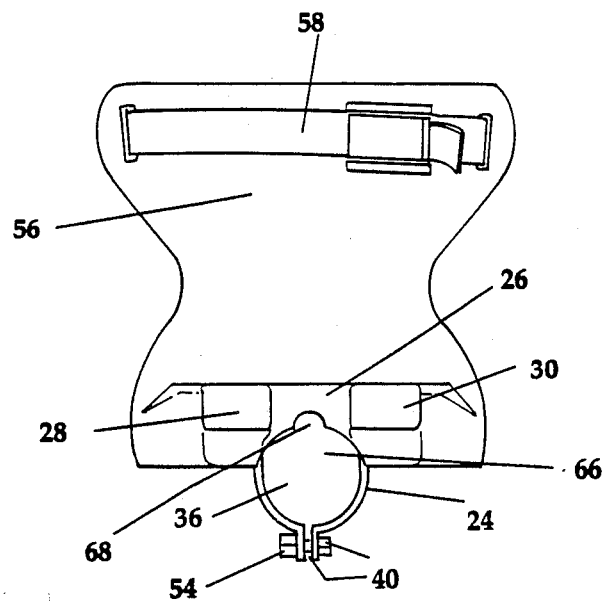
Figure_9
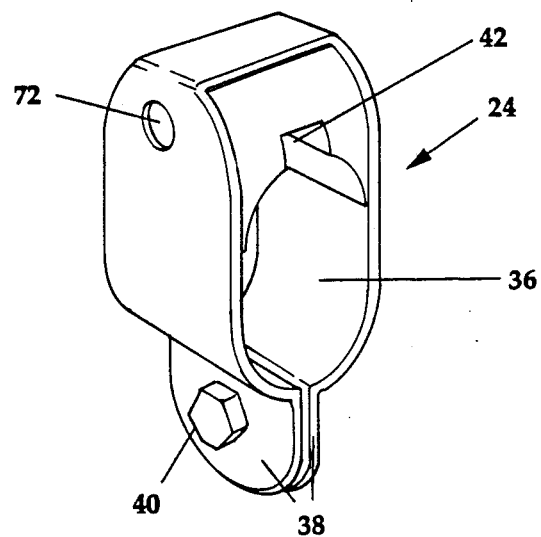
Figure_10

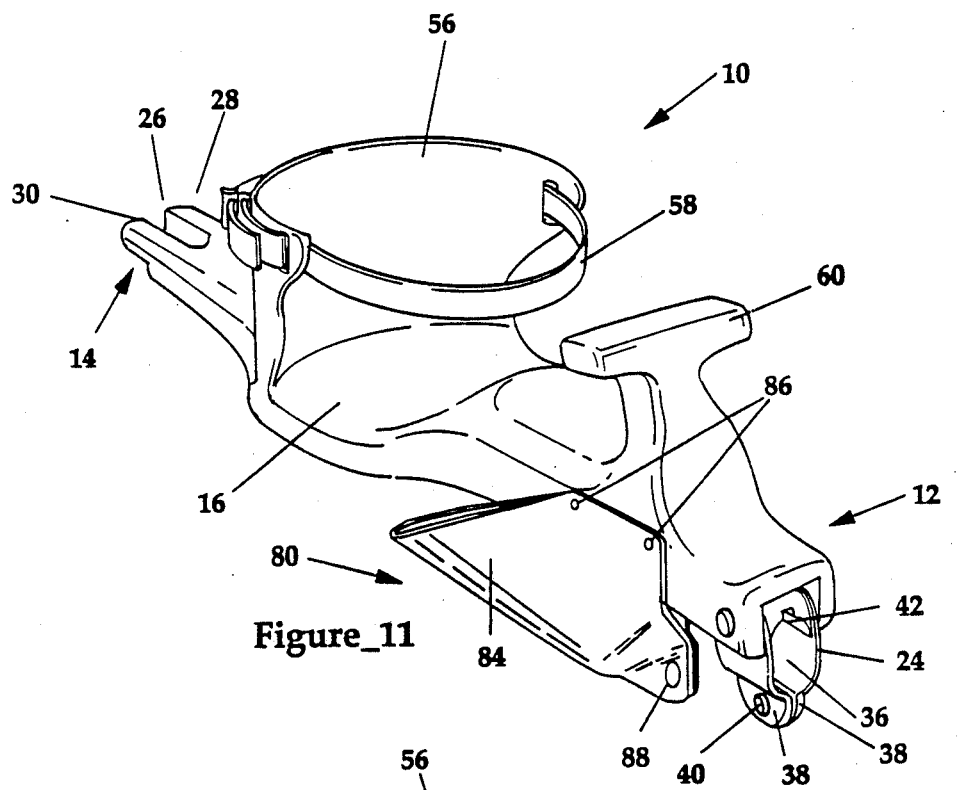
Figure_11
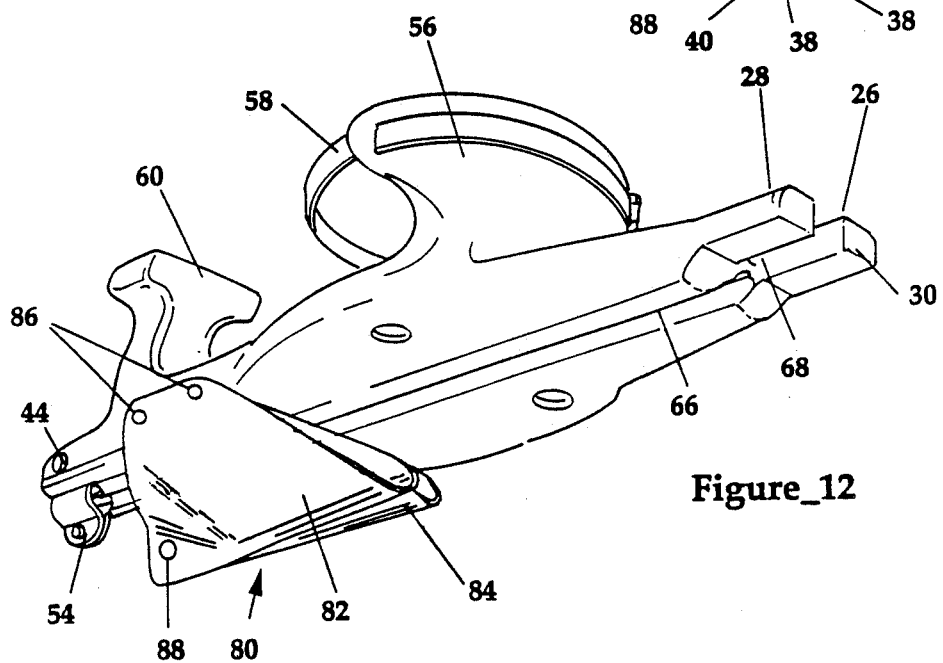
Figure_12

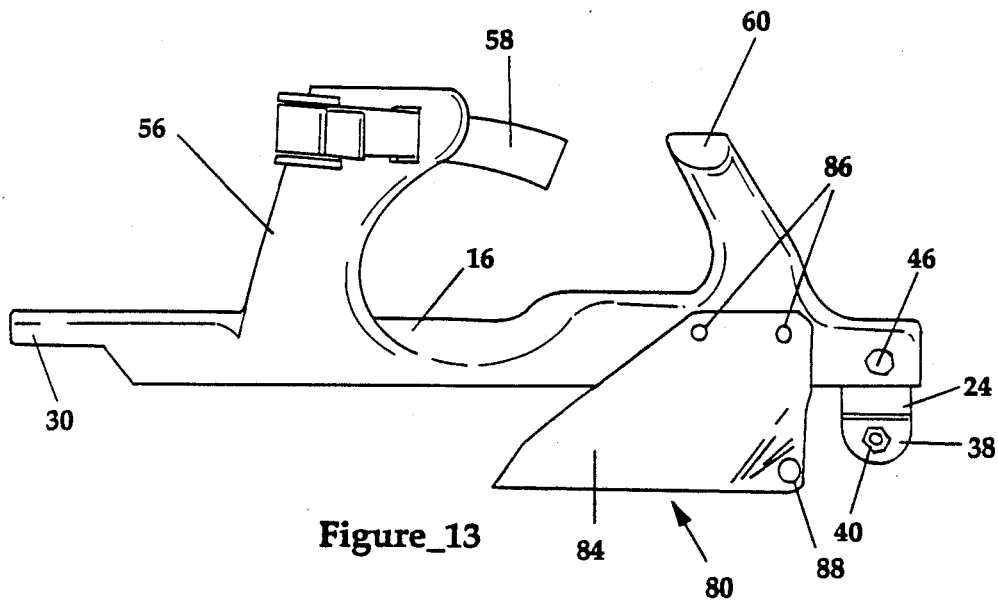
Figure_13

APPARATUS FOR CARRYING A PASSENGER ON A BICYCLE

The present invention relates to an apparatus for carrying a passenger on a bicycle, wherein the passenger is seated forward of the seat of the rider of the bicycle. In accordance with a first aspect of the present invention there is provided apparatus for carrying a passenger on a bicycle comprising carrier means having a first end and a second end and seat means located intermediate said first and second ends wherein said apparatus is provided with locating means for locating said carrier means on the frame of said bicycle said locating means being provided at at least two substantially mutually remote locations such that said carrier means is locatable on said frame substantially forward of the seat of the carrier of the rider of said bicycle.

In accordance with a second aspect of the present invention there is provided apparatus for carrying a passenger on a bicycle comprising carrier means having a first end and a second end and seat means located intermediate said first and second ends and said apparatus being provided with locating means for locating said carrier means on the frame of said bicycle such that said carrier means is locatable substantially forward of the seat of the rider of said bicycle and substantially rearward of the handle-bars of said bicycle.

The invention will now be described, by way of example, with reference to the accompanying drawings, in which FIG. 1 is an upper perspective view of the apparatus according to the present invention, with a foot-rest according to a first embodiment, located on a male bicycle;

FIG. 2 is an upper perspective view of the apparatus according to the present invention, without a foot rest, positioned on a female bicycle;

FIG. 3 is a first perspective view of the carrier of the apparatus according to the present invention;

FIG. 4 is a second perspective view of the carrier;

FIG. 5 is a front end view of the carrier;

FIG. 6 is a side view of the carrier;

FIG. 7 is an upper plan view of the carrier;

FIG. 8 is a lower plan view of the carrier;

FIG. 9 is a rear end view of the carrier;

FIG. 10 is a perspective view of the carrier bracket;

FIG. 11 is a first perspective view of the carrier having attached thereto a foot-rest according to a second embodiment;

FIG. 12 is a second perspective view of the carrier having attached thereto the foot-rest according to the second embodiment; and FIG. 13 is a side view of the carrier having attached thereto the foot-rest according to the second embodiment. In the drawings, there is shown an apparatus for carrying a passenger on a bicycle comprising a carrier 10.

The carrier 10 may be of generally elongate form and is provided with a first end 12 and a second end 14 and a seat 16 located between the first end 12 and the second end 14. The carrier 10 is provided with locating means for locating the carrier 10 on a bicycle frame.

The locating means allows the carrier 10 to be located on a bicycle frame 18 such that the carrier 10 is locatable substantially forward of the seat 20 of the rider of the bicycle and substantially rearward of the handle-bars 22. The locating means may be provided at two mutually remote locations on the carrier 10.

The locating means may be provided substantially at the first end 12 and the second end 14.

The locating means, shown in the drawings, comprises a bracket 24 at the first end 12 and a recess 26 defined by forked projections 28 and 30 at the second end 14.

The recess 26 is arranged such that the seat tube 32, or saddle pillar 34 is locatable therein.

The bracket 24 has a central aperture 36 and is provided with a pair of ears 38, each of which is provided with an aperture (obscured) to accommodate a bolt 40. The bracket 24 may be further provided with a groove 42 in the upper wall portion thereof. The groove 42 accommodates a brake cable (not shown) when the carrier 10 is positioned on a bicycle. A hole 72 is provided at the upper portion of each of the ears 38.

The bracket 24 is connectable to the first end 12 of the carrier 10 by a nut 44 and bolt 46.

The bracket 24 is locatable around the horizontal top tube 48 of a male bicycle, or the inclined top tube 50 or down tube 52 of a female bicycle, with the relevant bicycle tube passing through the central aperture 36. In a female bicycle, the bracket 24 will normally be located around the inclined top tube 50.

The bracket 24 may be secured on the relevant bicycle tube by tightening a nut 54 around the bolt 40.

The undersurface of the carrier 10 is provided with a longitudinally extending channel 66. The channel 66 is arranged to receive the horizontal top tube 48, when the carrier 10 is fitted to a male bicycle and provides additional stability.

The channel 66 may be provided with a longitudinally extending groove 68 in the upper portion of the channel 66. The groove 68 is provided to accommodate a brake cable (not shown) when such is located on the upper surface of the horizontal top tube 48 in a male bicycle.

The seat 16 is provided with a back support 56, which may also support the sides of a passenger, and which retains the passenger in the seat 16. A belt 58 is also provided to ensure that the passenger is retained in the seat 16. A handle 60 is also provided on the carrier 10 in front of the seat 16 for the passenger.

A foot-rest 62 (shown in FIG. 1) is also provided for the passenger. The foot-rest 62 is in the form of a plate 63 having three raised edges 65. The passenger rests his/her feet on the plate 63 and the raised edges 65 ensure that the passenger's feet are retained on the plate 63. The foot-rest 62 is securable to the down tube 52 of a male bicycle, or to the inclined top tube 50 or down tube 52 of a female bicycle, by way of a bracket 64. The bracket 64 may be securable to the relevant bicycle tubes in the same manner that the bracket 24 is securable.

The foot-rest 62 is positioned at a suitable location on the relevant bicycle tube relative to the carrier 10, such that the passenger may comfortably rest his/her feet thereon. An alternative embodiment to the foot-rest 62 shown in FIG. 1, is a foot-rest 80 shown in FIGS. 11, 12 and 13. The foot-rest 80 comprises pouches 82 and 84 in which the passenger places his/her feet. The pouches 82 and 84 are connected to the respective sides of the carrier 10 by way of connections 86. The connections 86 may be snap-type fasteners which allow the pouches 82 and 84 to be detachably connected to the carrier 10.

The pouches 82 and 84 are also connected to one another by a connection 88.

The foot-rest 80 is intended, as an alternative, for very young children whose legs might not be long enough to reach the foot-rest 62 shown in FIG. 1.

The manner of fitting the apparatus of the present invention to a male bicycle will now be described.

The bracket 24 is first pushed over the horizontal top tube 48 and loosely secured thereto by placing the bolt 40 through the apertures contained in the ears 38 and winding the nut 54 thereon.

The carrier 10 is then positioned on the bicycle frame 70 by holding it above and parallel to the horizontal top tube 48, with the recess 26 pointing to the rear of the bicycle. The carrier 10 is then pushed backwards such that the seat tube 32 or seat pillar 34 is located securely in the end of the recess 26. This prevents any axial rotation or backward slip of the carrier 10.

The bracket 24 is then moved along the horizontal top tube 48 such that the holes (obscured) in the first end 12 of the carrier 10 are aligned with the holes 72 in the bracket 24. The bolt 46 is then passed through these aligned holes and the nut 44 tightened thereon.

The nut 54 on the bolt 40 is also tightened.

The carrier 10 is then securely positioned on the bicycle frame 70.

The foot-rest 62 is then secured to the down tube 52 at a position comfortable for the passenger, relative to the carrier 10.

Alternatively, the foot-rest 80 is attached to the carrier 10.

The manner of fitting the apparatus of the present invention to a female bicycle will now be described.

The bracket 24 is first pushed over the inclined top tube 50 and loosely secured thereto by placing the bolt 40 through the apertures contained in the ears 38 and winding the nut 54 thereon.

The carrier 10 is then positioned on the bicycle frame 74 by holding it above the frame 74 and then pushing the recess 26 of the carrier 10 toward the seat tube 32 or seat pillar 34 such that the seat tube 32 or seat pillar 34 is securely located in the end of the recess 26. This prevents any axial rotation or backward slip of the carrier 10.

The front end 12 of the carrier 10 is then positioned near the inclined top tube 50 of the bicycle frame 74 and the bracket 24 is moved along the inclined top tube 50 such that the holes in the first end of the carrier 10 are aligned with the holes 72 in the bracket 24. A bolt 46 is then passed through these aligned holes and the nut 44 tightened thereon.

The nut 54 on the bolt 40 is also tightened.

The carrier 10 is then securely positioned on the bicycle frame.

The foot-rest 62 is then secured to the inclined top tube 50 or down tube 52 in the manner hereinbefore described with reference to a male bicycle.

Alternatively, the foot-rest 80 is attached to the carrier 10.

In both male and female bicycles, the bracket 24 may be retained in place once it is affixed to the bicycle, even if the carrier 10 and/or footrest 62 is removed.

A bolt 76 may be placed in the seat tube 32 to further support the second end 14 of the carrier 10. When a bolt 76 is used, the forked projections 28 and 30 would rest on the bolt 76.

A passenger using the apparatus of the present invention sits in the seat 16 with the harness 58 positioned around the passenger. The passenger's feet rest on the foot-rest 62 or in the foot-rest 80, as the case may be, and the handle 60 is provided for the passenger to use both hands to hold thereonto.

The carrier 10 may be molded from plastics material. The present invention is envisaged for use by small children riding as passengers on a bicycle under the control of an adult.

Modifications and variations such as would be apparent to a skilled addressee are deemed within the scope of the present invention.

We claim:

1. An apparatus for carrying a passenger on a bicycle having a seat supported on a seat post and a forward frame portion for supporting a handle bar and front fork assembly, including: a passenger seat for supporting a passenger, carrier means extending from the seat post substantially to the forward frame portion for supporting said passenger seat, said carrier means including a generally rigid support member extending generally along a longitudinal axis and having a proximal end and a distal end, first means disposed at said proximal end of said rigid support member for releasably receiving the seat post of the bicycle, said first means engaging the seat post in rotationally immobile fashion about said longitudinal axis, and second means disposed at said distal end of said rigid support member for releasably engaging the forward frame portion of the bicycle;

said second means for releasably engaging the forward frame portion of the bicycle including a bracket assembly secured to said forward frame portion of the bicycle, and means for releasably securing said distal end of said support member to said bracket assembly;

said distal end of said support member including a recess formed in a lower end surface thereof, said recess being dimensioned to receive a portion of said bracket assembly therein.

2. The apparatus for carrying a passenger on a bicycle of claim 1, wherein said means for releasably securing said distal end of said support member to said bracket assembly includes a pin extendable through said bracket assembly and through said distal end of said support member.

3. The apparatus for carrying a passenger on a bicycle of claim 1, further including means adapted to secure said apparatus alternatively either to the lateral tube of a men's bicycle frame or to the oblique down tube of a women's bicycle frame, said recess in said lower distal end of said support member disposed to receive said portion of said bracket assembly secured either to the lateral tube of a men's bicycle frame or to the oblique down tube of a women's bicycle frame.

4. An apparatus for carrying a passenger on a bicycle having a seat supported on a seat post and a forward frame portion for supporting a handle bar and front fork assembly, including: a passenger seat for supporting a passenger, carrier means extending from the seat post substantially to the forward frame portion for supporting said passenger seat, said carrier means including a generally rigid support member extending generally along a longitudinal axis and having a proximal end and a distal end, first means disposed at said proximal end of said support member for releasably receiving the seat post of the bicycle, second means disposed at said distal end of said support member for releasably engaging the forward frame portion of the bicycle, said second means including a bracket assembly secured to said forward frame portion, and means for releasably joining said distal end to said bracket assembly;

said distal end of said rigid support member including a recess formed in a lower end surface thereof, said recess being dimensioned to receive a portion of said bracket assembly therein.

5. The apparatus for carrying a passenger on a bicycle of claim 4, wherein said means for releasably securing said distal end of said rigid support member to said bracket assembly includes a pin extendable through said bracket assembly and through said distal end of said rigid support member.

6. The apparatus for carrying a passenger on a bicycle of claim 4, further including means adapted to secured said bracket assembly alternatively either to the lateral tube of a men's bicycle frame or to the oblique down tube of a women's bicycle frame, said recess in said lower distal end of said rigid support member disposed to receive said bracket assembly secured either to the lateral tube of a men's bicycle frame or to the oblique down tube of a women's bicycle frame.

7. The apparatus for carrying a passenger on a bicycle of claim 4, wherein said passenger seat is formed integrally with said rigid support member.

* * * * *